United States Patent Office 2,726,056
Patented Dec. 6, 1955

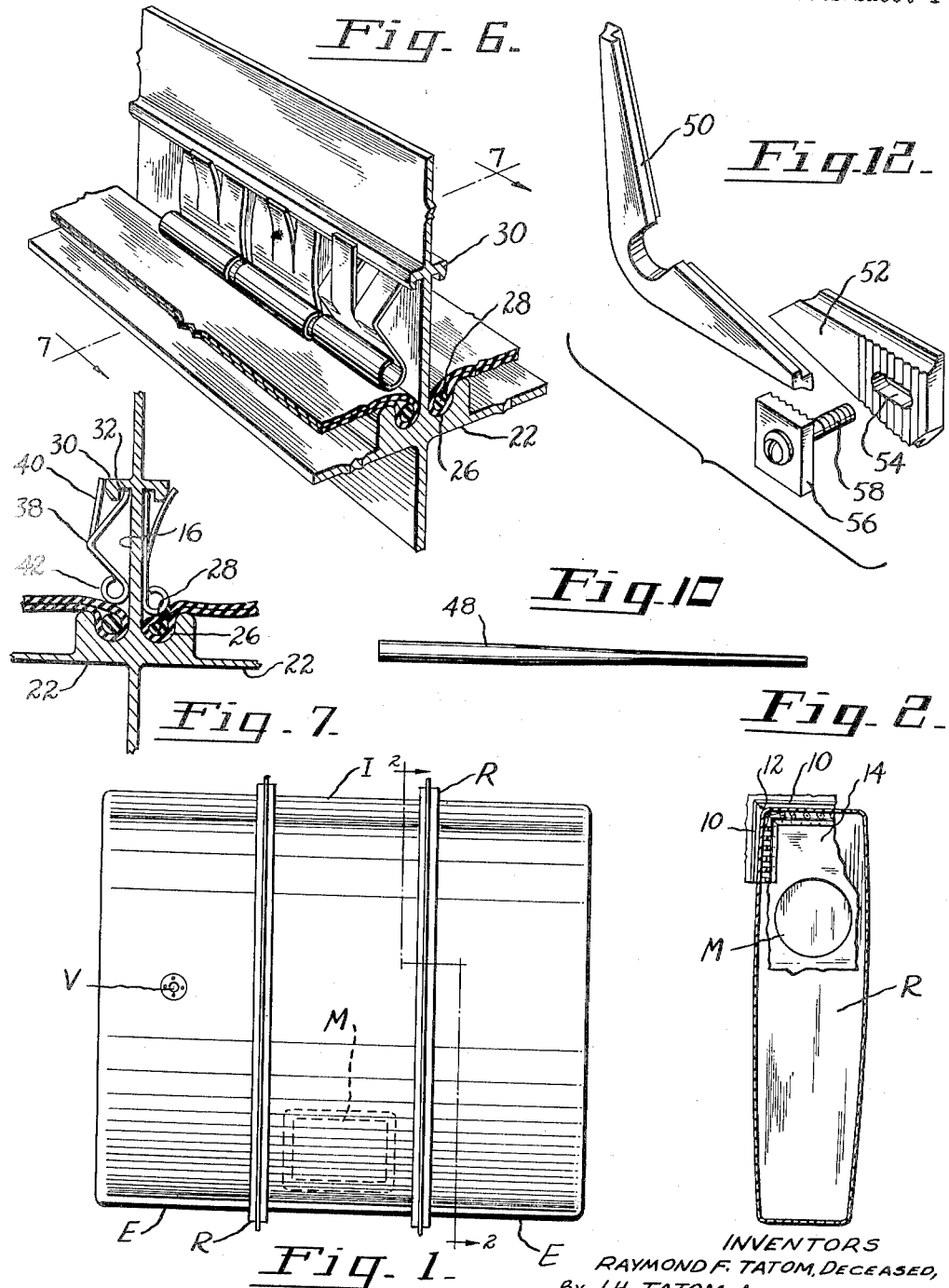

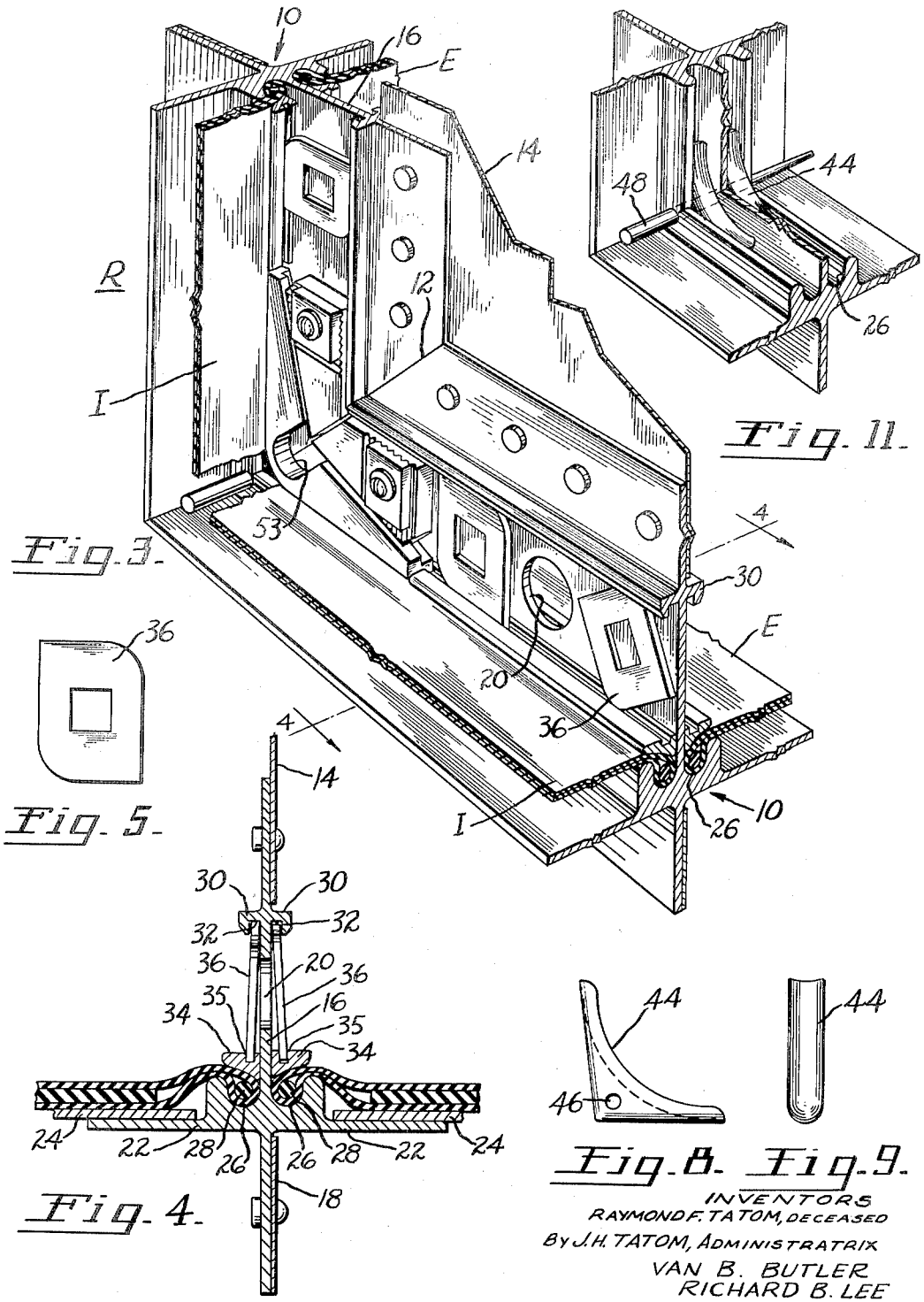

2,726,056

AIRCRAFT FUEL TANK STRUCTURE

Raymond F. Tatom, deceased, late of Tacoma, Wash., by Jean H. Tatom, administratrix, Tacoma, Wash., and Van B. Butler, Richard B. Lee, and Walter W. Lund, Seattle, Wash., assignors to Boeing Airplane Company, Seattle, Wash., a corporation of Delaware Application February 20, 1950, Serial No. 145,166

18 Claims. (Cl. 244—135)

This invention relates to edge-attachment of pliant sheet material, and more particularly to removable clamp-type sealed joint means useful, for instance, in construction of liquid containers having a pliant wall to be joined to a rigid wall or frame.

The invention is herein illustratively described by reference to its application in airplane wing multi-bay self-sealing fuel tank construction, wherein the self-sealing rubber laminated liner bags or sleeves forming the bay container units are joined at their open ends to the wing ribs functioning as inter-bay bulkheads. Openings in the bulkheads afford restricted communication between bays to facilitate venting and for equalization of fuel level as between bays, and access between the bays may be afforded by manholes in the bulkheads. The self-sealing tank liners in the end bays are closed at their outer ends, open at their inner ends and the latter secured to the adjoining inter-bay bulkheads. In the one or more intermediate bays the open ends of the self-sealing laminate are likewise fastened to the inter-bay bulkheads with the result that the composite tank structure is completely sealed within the wing.

A general object of the invention is to provide convenient and reliable means for detachably securing the edge of a pliant strip to a rigid support to form a sealed joint therebetween, and to do this without perforating and weakening the material.

Another object is to provide such a sealed joint, the elements of which are easily separated at will but are otherwise held together positively against any applicable force which would not first tear the adjoining pliant material itself.

A further object is to provide means for extending such a sealed joint around sharp corners as effectively as along a straight line or selected curve.

Still another object is to provide a sealed joint of the clamp or compression type for liquid containers having a pliant wall, and more specifically to provide a new and improved airplane wing self-sealing fuel tank sealed joint, such as may be used effectively in multi-bay tank installations as described. In this application convenient and rapid installation and removal of the laminate liners and securing means therefor from within the tank is a practical necessity. It is also important that the sealed joints be completely leak-proof, strong to resist the violent forces produced by the surge of liquid in the tank when hit by shrapnel or a bullet, and arranged so as to afford maximum fuel capacity within the available space. Other considerations will occur to those versed in aircraft construction.

An important feature of the invention resides in the provision of a compressible or resiliently deformable marginal enlargement or bead as an element of the joint, formed along the securing edge of the pliant strip or container wall, and a complemental bead-receiving groove formed in the rigid support, such as the wing rib, to which the edge is to be fastened.

Spaced inwardly from this groove a short distance and extending parallel thereto, is a flange or ledge rigidly connected to the support. This ledge functions as a reaction member between which and the bead are interposed thrust means operable to press and hold the bead firmly in the groove to effect a sealed joint.

Preferably the thrust means employed along the generally straight sections of joint comprises an elongated footing or bearing member or strip formed at one side to lie uniformly against the bead and at its opposite side provided with a retainer groove complemental to and facing toward the flange, which itself is provided with a similar groove. A plurality of presser elements bridging between these retainer grooves extend in series along their length. These presser elements comprise generally rectangular cam-like plate members which are longer than wide and have two diagonally opposite corners rounded on a substantial radius, the diagonal dimension between the rounded corners somewhat exceeding the length dimension of a plate. In order to turn them readily the plates are socketed to receive a turning tool. Depending upon the type of turning tool preferred, one or more apertures will be formed in each plate, although a single polygonal aperture formed centrally therein is preferred. After being loosely inserted between bearing member and reaction flange grooves, with their long dimensions generally parallel thereto, the cam plates are rotated through substantially a right angle into final position to seat their ends in such grooves, and in the process, by cam action, exert the desired pressure, permanently retained, against the bearing member and bead. As each plate is turned past its position of contact of its rounded corners with such bearing member and reaction flange it snaps into final position through the remaining angle because of the greater diagonal dimension than length of the plate. Preferably, the alternate opposite diagonal corners of these plate cam members are squared to limit such rotation positively and to afford opposite end bearing edges of maximum length. Only a positive counterturning movement will thereafter release the plate.

In the second illustrated form of thrust means used in combination with the thrust reaction flange or ledge and tank section marginal enlargement or bead received in the support groove, a plurality of toggle-action deformable clips are employed. These clips are formed of non-resilient sheet metal having an initial angular set which provides an effective contraction in their length dimensions sufficient to enable readily inserting them with clearance between the reaction flange and the tank section bead. After thus inserted, the clips are straightened, as by hammer blows, which, by reaction from the flange, causes them to compress the bead in the groove. A related feature resides in the provision of a removal tab on the clip. Such tab is retained against the outer edge of the flange to provide a convenient tool hold which may be gripped to exert a force transversely of the plane of the clip. Instead of using a grooved footing strip to be contacted by these clips, the clip edges may contact the compressible bead directly, being rolled to provide a substantial area of contact with the bead. By depression of the bead under these rolled edges pressed against it a firm footing is gained thereon. The opposite clip edges are retained in the groove formed in the reaction flange.

Further features of the invention reside in the provision of means enabling continuation of the sealed joint around sharp corners of the support means, as in the corner of a self-sealing fuel tank or the like. Such a means comprises a bead-accommodating, grooved corner fillet preferably of rubber, received in the support groove corner to build up and round out such corner for receiving the strip bead without acutely bending and overstressing the same. Leakage through an unsealed butt joint at the corner of a bulkhead between two of such corner fillet members may be prevented by a soft rubber rattail extending through aligned holes in such joint and in the two corner members. An L-shaped corner bearing element, whose outer apex corner is rounded conformably with the fillet, is employed to urge the bead cornerwise and uniformly against the fillet. Such L-shaped bearing element preferably has legs tapered in width, their edges opposite those contacting the tank section bead being inclined. The desired pressure against the bead at the corner is obtained by means of wedges driven between the support's thrust reaction flange or ledge and these inclined edges of the L-shaped bearing element.

These and other features, objects and advantages of the invention, including certain details of construction of its preferred forms, will become further evident from the following description thereof based upon the accompanying drawings which illustrate the invention as applied to airplane wing self-sealing multi-bay fuel tank installations.

Figure 1 is a simplified plan view of an airplane wing multi-bay fuel tank, showing the general form and relationship of the tank container units; Figure 2 is a transverse section thereof taken on line 2—2 in Figure 1.

Figure 3 is an isometric view with parts broken away, showing the inner corners of adjoining tank container unit sleeves as joined to the rib structure in accordance with the invention.

Figure 4 is a sectional view taken on line 4—4 in Figure 3.

Figure 5 is a side view of one of the presser elements employed in the form of sealed joint appearing in Figure 3.

Figure 6 is an isometric view of a modified joint construction characterized primarily in the modified type of presser elements used; and Figure 7 is a sectional view taken on line 7—7 in Figure 6.

Figure 8 is a side view of the fillet member employed in forming the joint corners; and Figure 9 is an end view thereof.

Figure 10 is a side view of a tapered rubber sealing element in the form of a rattail.

Figure 11 is an isometric view of a structural wing rib mitered butt joint located at the corner of the tank end wall with parts broken away to reveal the arrangement of the corner fillet and the cooperating rattail element sealing the structural mitered joint.

Figure 12 is an isometric exploded view showing parts used in completing the corner portion of the sealed joint as it appears in Figure 3.

As shown in Figures 1 and 2, a typical airplane wing multibay fuel tank installation of the flexible rubber material self-sealing type includes the two outer or end bay container units E and one or more intermediate bay units I located between the end bay units. All are generally rectangular in cross section as shown in Figure 2, conforming to wing shape, but the end bay units are closed at their outer ends and open at their inner ends, while the intermediate units are merely tubular sleeves, open at both ends. The open ends of the several bag or sleeve units E and I are secured and sealed to the wing ribs R in adjoining effectively contiguous relationship. Such ribs constitute inter-bay bulkheads or partitions which have suitable openings to afford restricted flow of fuel between the bays and to enable venting of all through a common opening V. The composite fuel tank has a suitable manhole M in one of the tank units. Access to the interiors of the remaining units is afforded through interior manholes M' in the wing rib bulkheads R. The units are brought into the wing and removed from the wing by collapsing and compacting them for passage through the manholes. Accordingly, the wing structure itself need not be dismantled in any respect for these operations.

At the upper left in Figure 2 there appears a simplified fragmentary showing of detail structure relating to the sealed joint, about to be described. Referring both to this figure and to Figure 3, the principal rib structural elements employed in, or cooperating as a support for the sealed joint, include the special structural sections 10 forming a generally rectangular end frame of mitered butt joint construction. These frame sections are held together by suitable means such as a central bulkhead plate 14 riveted at its edges to the inner margin of the web elements 16 of the structural members 10, and by an outer reinforcing plate or plates 18 riveted to the outer margin of such web elements, as shown in Figures 3 and 4. The web 16 is provided with a plurality of apertures 20 located inside the tank for passage of liquid fuel between tank bays.

The special structural sections 10 making up the generally rectangular support frame structure have similar oppositely projecting support flanges 22 extending around the peripheral edge of the structure, and to the thin outer margins of these flanges are secured metal sheets 24 backing the self-sealing wall material of the tank units, as shown in Figure 4. These flange elements 22 are thicker at their root portions, however, and each is formed with a continuous groove 26 opening inwardly of the frame, immediately adjacent to the web element 16. The groove edges remote from the web 16 are rounded, and preferably the groove bottoms are also rounded as shown best in Figure 4. These grooves are intended to receive an edge bead 28 formed along the open end edges of the self-sealing tank units. Such a bead is preferably generally round in cross section and of a size or thickness materially greater than that of the adjoining pliant wall material, to fit snugly in a groove 26. The pliant self-sealing tank liner wall material, usually of laminated or sandwich construction, with vulcanized rubber outer layers and an unvulcanized soft rubber inner layer, is integrated with the bead by a double layer of vulcanized rubber which laps over the round outer edge of the groove 26. The bead 28 itself is composed of a round core rod of rubber encircled by the double overlapping marginal edges of the vulcanized layers which join the self-sealing rubber laminate proper to the bead. This bead of a resiliently deformable semi-rigid material fitting in the groove 26, is an important feature contributing to the success of the joint structure.

The sealed joint construction further includes readily installed and removable thrust means pressing the bead 28 firmly into its retainer groove 26, such that it cannot be dislodged therefrom, and compressing it to an extent that lateral expansion causes it to hug closely the groove walls and form a tight seal.

To this end the structural members 10 forming the frame structure carry flanges 30 projecting oppositely from opposite sides of web element 16 and extending parallel to the respective grooves 26 which they overlie at close spacing, the flanges 30 likewise extending around the periphery of the structural frame. These flanges, or their equivalent, provide a reaction support for thrust applied to the beads in such grooves. The flange elements or reaction means 30 are preferably much lighter and narrower than the parallel support flange elements 22 defining the grooves 26, and have narrow grooves 32 formed therein for a purpose to be described.

In the form of sealed joint structure appearing in Figures 3 and 4, the thrust means reacting from a grooved flange 30 against the bearing member 34 includes the substantially incompressible bearing strip or rail-like footing 34 formed at one side to bear uniformly against the resilient tank section bead 28, and at its opposite side having a narrow groove 35 facing the flange groove 32. This bearing strip is preferably wedge-shaped in cross section, that is, tapers in thickness from its edge disposed immediately adjacent to the web element 16 to its outer edge which extends to and preferably slightly overlaps the outer edge of the groove 26. When pressed against the bead the bearing strip tends to wedge between the web element 16 and the adjacent side of the bead. This provides a firm footing for the bearing strip which retains it against slipping away from the web element and out of bead-engagement as long as such member is subjected to pressure. At the same time, the narrow outer edge portion of the bearing strip is located in close proximity to the outer edge of the groove, and constricts the neck of rubber adjoining the bead, such that the bead cannot be pulled from the groove through the restriction even by a great pull produced by tension in the tank wall material.

A plurality of presser elements or cam plates 36 are retained jointly in grooves 32 and 35 and extend in series arrangement lengthwise thereof. These presser elements individually comprise generally rectangular cam-like plates narrow enough for broadside insertion between flange and bead into the retainer grooves. Two diagonally opposite corners of these plates are rounded on a substantial radius to merge gradually with the adjoining straight edges while the alternate opposite corners preferably are substantially square. The cam plates inserted between the reaction flange 30 and bearing strip 34 are rotated through substantially 90 degrees in order to swing their length dimensions from parallel to perpendicular relationship to the reaction flange and bearing strip. This rotation is facilitated by the rounding of the plate corners, and, because of the greater length than width of the cam plates, produces thrust which, applied to the bearing member 34, contacts one side of the sheet edge or neck and thereby presses the opposite side of the sheet against the side of the groove contacted by it. At the same time such cam plate rotation compresses and wedges the underlying bead 26 into intimate contact with the base of the groove 26 and strip 34. The short edges of the cam plates 36, being substantially straight from their rounded corners to their square corners, afford a maximum length of bearing contact in the respective retainer grooves. Moreover, because of these substantially squared corners, turning of the cam plates is effectively limited at the angle necessary to attain uniform contact of their shorter flat edges with the groove bases, preferably at a right angle. Because the diagonal dimension of a plate between its rounded corners somewhat exceeds its length dimensions the plate tends to snap into and remain firmly in its final installed position when turned beyond the angle at which its rounded corners contact the reaction flange and bearing strip.

Each cam plate may be rotated separately as by means of a suitable tool engaging one or more apertures in the plate. As shown, a single aperture of generally polygonal form, being square, for example, is formed centrally in the plate to constitute a tool socket. The plates are inexpensive to manufacture and afford, in conjunction with footing 34, a convenient thrust means quickly installed and removed, although because of their snap action previously mentioned a positive counter-rotational torque must be applied to the plates to dislodge them.

The modified sealed joint construction appearing in Figures 6 and 7 is characterized primarily in the difference between the type of thrust elements reacting between the flange 30 and tank section edge beads 28 in grooves 26. Such a means does not require the use of an elongated bearing member such as the strip 34 in the previously described form, because the edges of the presser elements themselves may be formed to bear directly on the bead and provide their own secure footing thereon substantially continuously along the bead, yet without perforating the bead or tank wall material. It will be understood, however, that an elongated bearing member could be used here also if desired.

Such a modified presser or thrust element comprises the substantially non-resilient metal clip 38 which operates on the toggle principle in producing thrust or pressure against the bead 28. When initially inserted between the retainer groove 32 in flange 30 and bead 28 (left in Figure 7 and in the foreground of Figure 6) it has a substantial angular set, that is, is bent along a line between and generally parallel its thrust-reaction edges. This effectively contracts the clip in length sufficiently for ready insertion between the reaction flange and the corresponding bead 28. Thereupon it is straightened or flattened against the structural web 16, as by striking it with a hammer, producing expansion thereof transversely of bead 28. Such lengthening results in compression of the bead and holds it firmly thereafter in groove 26.

The bead-contacting edge 42 of each clip is preferably rolled on a diameter somewhat smaller than the width of the grooves 26 so that this rolled edge under pressure tends to deform the bead and wedge into the groove adjacent to the web 16 and behind the neck of pliant material extending out and over the outer edge of the groove, as shown at the right in Figure 7. As a result there is no tendency for the clips to work loose by slipping away from the web 16. By placing these clips in a row with the edges of adjacent clips practically touching, they exert pressure on the tank bead along a substantially continuous line. The rolled edge of the clips may be given various forms, such as generally the cross-sectional form of the bearing member 34, if desired.

For convenience in later detachment of the clips they are provided with removal tabs 40 located generally centrally between their edges, which project outward somewhat to contact the outer edge of the flange initially and remain in contact with such flange edge after the clip is flattened.

The foregoing detailed description applies primarily to the substantially straight or moderately curved sections of sealed joint. Provision is also made for extending it around sharply reentrant corners, such as the corner intersections of the structural frame members 10 in the illustrated case. It is not feasible to attempt bending the tank self-sealing wall material and bead so sharply as to follow the groove 26 around a sharp corner because of the physical difficulty and also the resulting acute stresses in the material tending to weaken it at the bend. Accordingly a corner fillet 44, preferably of rubber, is inserted in the corner intersection of adjoining runs of groove 26, as shown in Figure 11, in order to build up and round out the corner on a substantial radius, the fillet itself being grooved to receive the bead 28. The outer, straight edges of the corner piece are rounded transversely to fit snugly into the grooves 26 in the adjoining structural sections 10.

Preferably the fillet block 44 is provided with a small aperture 46 near its outer corner or apex, aligned with corresponding apertures extending, at the miter joint, through the side walls of the two opposite grooves 26 and the intermediate web 16 of structural member 10. A rattail 48 (Figures 10 and 11), also preferably of rubber and tapered in cross section, is drawn tightly into these aligned apertures. As it is drawn it stretches lengthwise and contracts in cross section, and when it is released the rattail expands in cross section and contracts lengthwise, because of its elastic properties, and snugly engages the walls of the apertures in which it is received. Since these apertures intersect the miter butt joint crack between adjoining structural frame members 10, any tendency for gasoline or other liquid fuel to seep by capillary action through the crack is effectively blocked by the rattail. Moreover, the rattail acts as a retainer for the rubber fillet blocks 44 at the sub-assembly stage of manufacture, the fillet blocks and rattails being installed in the rib frame structure before it is integrated with the wing structure as a whole, installation of the self-sealing tank sections themselves coming still later.

After the bead 28 is laid in place at the corner on the fillet block 44 an L-shaped bearing member 50 (Figures 3 and 12) is placed against it. The apex or outer corner of this bearing member is curved conformably to the fillet and when such member is pressed down into the corner, the bead is uniformly and tightly pressed into the corner fillet groove and adjoining portions of grooves 26. The legs of this bearing member are tapered in width, their inner edges being inclined from the corner toward the groove 26. Pressure is imparted to the bearing member 50 preferably by means of two wedges 52 driven lengthwise of the bearing member legs toward the corner and suitably guided between the inclined edges of the bearing member and the flanges 30. A deep notch 53 in the inside corner of the bearing member enables it to bend under influence of the wedging to press uniformly on the bead.

To guide the wedges 52 for such wedging movement ribs are formed on their opposite edges to fit one in the groove 32 of a bulkhead flange 30 and the other in lateral abutment with and behind a complemental rib formed on the tapered edges of the bearing member 50. The wedges are slotted at 54 and provided with serrations on their outer faces extending transversely of the direction of movement of the wedges into wedging position. A serrated block 56 is apertured to receive a bolt 58 which passes slidably through the slot 54, through an aligned bolt retaining aperture (not shown) in the web 16, and through the slot of the wedge and aperture of the block 56 on the opposite side of the web. After the wedges have been driven lengthwise to attain the desired wedging pressure on bearing member 50 and in turn on the tank section bead 28, the bolt is tightened in its aperture to press the serrated blocks 56 firmly against the complemental serrations on the faces of their corresponding wedges, and the latter are then held positively against loosening.

We claim as our invention:

1. Means detachably edge-securing a pliant sheet to a support structure, comprising resiliently and deformably compressible bead formed continuously along the edge of the sheet and of appreciably greater thickness than the adjoining sheet, the support structure having an elongated groove formed therein and receiving said bead, elongated ledge means carried by the support structure and extending parallel to said groove at a predetermined short distance therefrom, said ledge means having therein a groove opening toward the first-mentioned groove, and readily removable thrust means comprising a plurality of presser elements arranged in a row along said grooves and forcibly interengaged between the groove in said ledge means and said bead, and pressing said bead uniformly along its length firmly into said groove, and thereby removably securing the sheet edge to the support structure, each of said presser elements comprising a substantially non-resilient, sheet metal toggle-action clip formed with an initial angular set therein shortening such clip between its respective groove and sheet bead contacting edges for ready insertion thereof between the ledge means groove and the sheet bead, and thereafter deformably expanded edgewise transversely of such ledge and bead by force applied transversely to said clip, and thereby applying substantial pressure against the bead, such clip having an ear projecting past the outer edge of the ledge means and engaging such edge to provide a hold by which the installed clip may be readily grasped and removed from engagement between the ledge means groove and the sheet bead and further having a bead-engaging edge which is rolled and contacts the bead over a substantial area and wedging between the sheet edge and one side of the groove.

2. Means detachably edge-securing a pliant sheet to a support structure, comprising a resiliently and deformably compressible bead formed continuously along the edge of the sheet and of appreciably greater thickness than the adjoining sheet, the support structure having an elongated groove formed therein and receiving said bead, elongated ledge means carried by the support structure and extending parallel to said groove at a predetermined short distance therefrom, said ledge means having therein a groove opening toward the first-mentioned groove, and readily removable thrust means comprising a plurality of presser elements arranged in a row along said grooves and forcibly interengaged between the groove in said ledge means and said bead, and pressing said bead uniformly along its length firmly into said first-mentioned groove, and thereby removably securing the sheet edge to the support structure, each of said presser elements comprising a generally rectangular plate member longer than wide, having two diagonally opposite corners rounded on a substantial radius, with a material portion of each of its two short edges being substantially straight and tangential to the adjoining corner rounding and having at least one aperture therein engageable by a tool to rotate said plate member in its body plane, such plate member being orientable with its long dimension transversely of the grooves, and reacting from the ledge means to exert pressure forcing the bead tightly into the support means groove, the width of said plate being less than the distance between the bottom of said ledge groove and the bead, whereby the plate member in its initial position can be readily inserted between the ledge means groove and sheet bead with its long dimension generally parallel to the grooves and the length dimension of said plate member being somewhat less than the diagonal dimension thereof between said rounded corners.

3. The detachable edge-securing means defined in claim 2 wherein the other two corners of the plate member are substantially square, and the aperture is polygonal.

4. The detachable edge-securing means defined in claim 2 wherein the readily removable thrust means includes a substantially incompressible bearing strip having one side uniformly engaging the bead and having a groove in its opposite side facing the ledge means groove and receiving the edges of the presser plate members.

5. A releasable sealed joint for a liquid container between an open end pliant peripheral wall and a rigid end wall, and the joint including at least one angled corner formed in the peripheral wall and substantially straight portions extending away from the corner, said joint comprising a deformable bead carried by and extending continuously along the edge of the peripheral wall, means around the periphery of such end wall, including the angled corner of the joint, defining a groove on one side of such wall facing inward and receiving the bead, a rib projecting from the same side of the rigid end wall, spaced inward from said groove and extending in continuous parallel relation thereto, a bead-accommodating grooved corner fillet block received in said groove at the angled corner of the joint to build up and curve the groove corner and receiving the bead in sharply curved shape, and removable thrust means forcibly interengaged between said rib and said bead and pressing the latter into said groove uniformly along its length, thereby forming a sealed joint extending continuously around such angled corner.

6. The joint defined in claim 5 wherein the removable thrust means comprises, along the substantially straight portions of the joint, a plurality of presser elements arranged in series along the groove, and, at the corner, a generally L-shaped bearing member having bead-contacting legs forming an angle corresponding to the angled corner angle and curved at its outer apex substantially in conformity with rounding of the corner fillet block, and a bearing member presser element interengaged between the rib and each of said bearing member legs, urging said bearing member into the corner and thereby pressing the bead uniformly into close engagement with said groove.

7. The joint defined in claim 6 wherein the bearing member presser elements are tapered toward the corner and the edges of the bearing element engaged thereby are complementally inclined and bearing pressure on the bead is effected by wedging of the bearing member presser elements between such inclined edges of the bearing element and the rib, and releasable locking means securing such bearing member presser elements, in wedged position, to the rigid end wall to retain such bearing pressure of the bearing element on the bead.

8. The joint defined in claim 6 wherein the L-shaped bearing member at its reentrant corner is notched a major fraction of its width toward its curved outer apex.

9. The joint defined in claim 5 wherein the rigid end wall is formed at the angled corner in the peripheral wall by mitered butted structural sections and, to block seepage by capillary action through the miter joint crack, bypassing the bead seal, the mitered sections have complemental notches forming an aperture at the crack between them, outside the peripheral wall, and a resilient rattail element drawn and wedged tightly into said aperture.

10. The joint defined in claim 9 wherein the corner fillet block is of rubber-like material and is provided with an aperture aligned with the aperture in the mitered butted end wall sections, the rattail extending through both wall and fillet block apertures and retaining such block in the groove corner independently of pressure on the block applied through the bead.

11. An internal wing fuel tank installation for airplanes comprising, in combination with an airplane wing bulkhead structure extending chordwise of the wing, a tubular tank section of liquidproof self-sealing pliant sheet material received conformably inside the wing adjacent said bulkhead and having an open end with a securing edge extending continuously therearound adjoining said bulkhead, an open groove formation extending continuously around the periphery of the side of said bulkhead facing said tank section, with the groove therein opening in directions generally parallel to said bulkhead, said tank section securing edge having an enlarged bead extending continuously therealong formed integrally therewith and of a thickness materially in excess of the adjoining tank section sheet material total thickness, said bead being received continuously in said bulkhead groove, around the length thereof, ledge means on the same side of said bulkhead generally facing and extending parallel to said groove along substantially the entire length thereof receiving said edge bead, and thrust means lodged between said ledge means and said groove-received beaded sheet edge substantially continuously along the entire length of said groove, said thrust means establishing a restriction between such thrust means and said groove side of a width materially less than the thickness of said edge bead to prevent pulling of the latter from the groove by sheet tension, and said thrust means pressing said bead firmly into said groove.

12. The combination defined in claim 11, wherein the ledge means has a groove generally facing the sheet edge bead-receiving groove, and the thrust means comprise a plurality of substantially non-resilient sheet metal toggle-action clips each being formed with an initial angular set therein shortening such clip for ready insertion thereof extending transversely between the edge-bead receiving groove and the ledge means groove, and being expandable by removal of such angular set by force applied transversely thereto and thereby resulting in pressure of such clips exerted against the tank section edge bead for pressing such bead into its groove.

13. The combination defined in claim 11 wherein the ledge means has a groove facing the bead-receiving groove, and the thrust means comprises a rigid elongated bearing member adapted at one side thereof to lie uniformly against the bead and having a groove in its opposite side to face the ledge means groove, and a plurality of generally rectangular presser plates adapted to be arranged in series along such member with opposite edges engaged in the bearing member groove and in the ledge means groove, respectively, each such presser element being longer than wide, having two diagonally opposite corners rounded on a substantial radius and its remaining two corners substantially square, and having means engageable by a tool for rotating the plate in its body plane from an initial position oriented with its long dimension generally parallel to the grooves to a final position with its long dimension rotated into position substantially at right angles to the grooves, to press said bearing member tightly against the bead by cam action and reaction from the rib.

14. A multibay internal airplane wing liquid storage tank installation comprising, in combination, a wing rib structure dividing the wing spanwise into separate interior spaces adjoining opposite sides of said rib structure, a rigid projection carried by and extending substantially continuously around the entire outer periphery of said rib structure on both sides thereof, collapsible liquid storage tank bag sections of flexible material received conformably within said interior spaces respectively and having open ends with securing edges extending continuously therearound adjoining said rib structure and disposed in substantially continuous contact with said rigid projections, reaction means carried fixedly on both sides of said rib structure and extending substantially continuously around the entire periphery thereof located at a substantially uniform short spacing inwardly from said respective projections, and bag-securing thrust means lodged releasably between said reaction means and bag-edge contacted projections on both sides of said rib structure retentively holding said bag edges pressed firmly against said respective projections substantially continuously therearound to form a liquid tight seal therewith.

15. In combination, a sheet of pliant material having a securing edge, said sheet having a continuous bead extending along said securing edge and joined integrally thereto, said bead being of a thickness materially in excess of the adjoining total thickness of said sheet, a rigid supporting structure comprising a backing member having an elongated groove receiving said bead continuously along the length of said groove with the adjoining sheet extending generally outwardly from said backing member, and sheet retaining means holding said beaded sheet edge securely in said groove comprising reaction means rigidly connected to said support structure and extending therealong generally facing and parallel to said groove, and thrust means lodged between said reaction means and said groove-received beaded sheet edge along the length of said groove, said thrust means being seated against one side of the sheet edge as the latter enters the groove and thereby pressing the opposite side of said sheet edge against the groove side adjacent thereto, said thrust means establishing a restriction between said thrust means and said groove side of a width materially less than the thickness of said sheet edge bead.

16. A removable tank section for internal wing fuel tanks in airplanes and the like, comprising a tubular tank section of liquidproof self-sealing pliant sheet material having open ends each with a securing edge extending therearound, said securing edge having an enlarged bead extending continuously therealong formed integrally therewith and of a thickness materially in excess of the adjoining tank section sheet material total thickness, said bead being adapted for sealing contact with a suitable support to which said edge is secured by retaining means acting cooperatively with said bead, the self-sealing pliant sheet material of the tank section comprising protective outer sheet layers and an inner self-sealing core layer sandwiched therebetween, and the beaded edge of the tank section comprising a continuous resiliently compressible core rod extending continuously along said edge enveloped by said outer sheet layers joined together and extending around such core rod.

17. A multibay internal airplane wing liquid storage tank installation comprising, in combination, a wing rib structure dividing the wing spanwise into separate interior spaces adjoining opposite sides of said rib structure, a rigid projection carried by and extending substantially continuously around the entire outer periphery of said rib structure on at least one side thereof, a collapsible liquid storage tank bag section of flexible material received conformably within said interior space and having an open end with a securing edge extending continuously therearound adjoining said rib structure and disposed in substantially continuous contact with said rigid projection, and bag-securing thrust means supported on said side of said rib structure substantially continuously around the entire periphery thereof at a substantially uniform short spacing inwardly from said projection, said thrust means being lodged removably against said bag edge contacting said projection and retentively holding said bag edge pressed firmly against said projection substantially continuously therearound to form a liquid tight seal therewith.

18. Means detachably edge-securing a pliant sheet to a support structure, comprising a resiliently and deformably compressible bead formed continuously along the edge of the sheet and of appreciably greater thickness than the adjoining sheet, the support structure having an elongated groove formed therein and receiving said bead, elongated ledge means carried by the support structure and extending parallel to said groove at a predetermined short distance therefrom, said ledge means having therein a groove opening toward the first-mentioned groove, and readily removable thrust means comprising a plurality of presser elements arranged in a row along said grooves and forcibly interengaged between the groove in said ledge means and said bead, and pressing said bead substantially uniformly along its length firmly into said groove, and thereby removably securing the sheet edge to the support structure, each of said presser elements comprising a generally rectangular plate member longer than wide, having two diagonally opposite corners rounded on a substantial radius, with a material portion of each of its two short edges being substantially straight and tangential to the adjoining corner rounding and rotatable in its body plane, such plate member being orientable with its long dimension traversely of the grooves, and reacting from the ledge means to exert pressure forcing the bead tightly into the support means groove, the width of said plate less than the distance between the bottom of said ledge groove and the bead, whereby the plate member in its initial position can be readily inserted between the ledge groove and sheet bead with its long dimension generally parallel to the grooves and the length dimension of said plate member being somewhat less than the diagonal dimension thereof between said rounded corners.

References Cited in the file of this patent

UNITED STATES PATENTS

| | | |
|---|---|---|
| 975,172 | Speer | Nov. 8, 1910 |
| 1,013,531 | Carmany | Jan. 2, 1912 |
| 1,726,970 | Wichelhaus | Sept. 3, 1929 |
| 2,394,401 | Overbeke | Feb. 5, 1946 |
| 2,397,184 | Klose | Mar. 26, 1946 |
| 2,508,906 | Cunningham et al. | May 23, 1950 |